Patented Aug. 13, 1929.

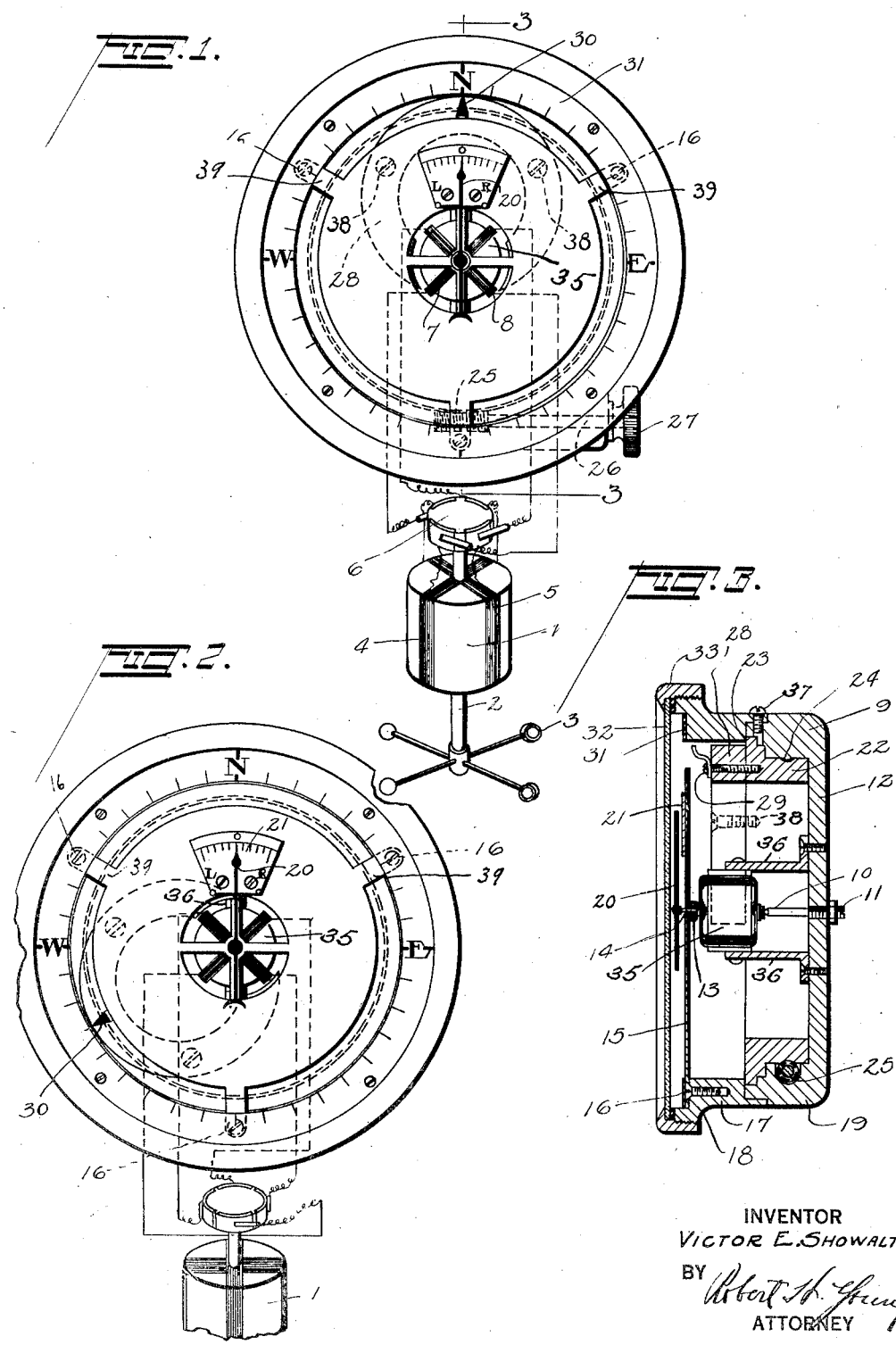

1,724,048

UNITED STATES PATENT OFFICE.

VICTOR E. SHOWALTER, OF DAYTON, OHIO.

EARTH INDUCTOR COMPASS GALVANOMETER.

Application filed July 23, 1925. Serial No. 45,566.

This invention relates to indicating mechanism for use with earth inductor compasses, and the primary object is the provision of an indicator adapted to be mounted upon a craft which will indicate to the pilot the direction in which the craft is moving.

The instrument is provided with two coils located 90° apart which are adapted to be connected to the two sets of brushes, which operate on the commutator of an ordinary two circuit earth inductor compass which is provided with a commutator having four segments, the opposing brushes being arranged in sets, each of which is connected to one of the coils mentioned. The two coils of the instrument cooperate with a fixed permanent magnet, these coils being mounted between the poles of the magnet upon an axis so that they are permitted to move to align the resultant of the field produced by the two coils with that produced by the permanent magnet. The permanent magnet is adapted to be adjusted manually through a range of motion of 360° in order to maintain the two coils in a predetermined normal position. The instrument is provided with an indicating scale graduated in points of the compass so that the direction in which the craft is pointed will be indicated by an index movable with the magnet, and cooperating with this graduated scale.

With the foregoing objects in view, my invention will now be more fully set forth in the following description and claims, reference being had to the accompanying drawing, in which Fig. 1 is a plan view of the instrument which is shown connected to the earth inductor generator;

Fig. 2 is a view corresponding to Fig. 1 with the craft pointed in a different direction and showing a different compass card reading, and Fig. 3 is a central section on the line 3—3 of Fig. 1.

Referring more particularly to Fig. 1, an earth inductor generator is shown generally at 1, which is adapted to rotate about a vertical axis 2 in the earth's field, being driven by a suitable means such as the anemometer or impeller 3 which is exposed to the air rush when the instrument is mounted upon an aircraft. The two coils of the earth inductor designated 4 and 5 are each connected to segments of a commutator 6, the segments being arranged in opposing sets as shown so that the voltage induced across the pairs of brushes will be uni-directional. The brushes are fixed on the craft and preferably arranged so that the longitudinal axis of the craft extends through the insulation provided between adjacent commutator segments. The voltage induced in the circuit connected to one set of brushes will be proportional to the sine of the angle between the earth's magnetic field and one of the coils of the earth inductor while the voltage induced in the circuit connected to the other set of brushes will be proportional to the corresponding cosine, since the two coils of the earth inductor are arranged at 90° apart. These two sets of brushes are connected to two coils 7 and 8, which surround the soft iron core piece 35, fastened in place by standards 36. These two coils are arranged 90° apart in space and mounted upon a central axis corresponding to the axis of the housing or casing 9 of the instrument. To this end a conical pointed bearing post 10 is mounted by means of its threaded end 11 in the rear plate 12 of the housing and a top bearing 13 is provided for the shaft 14 in a thin metal plate 15. The plate 15 is provided with extensions 39 on its periphery having openings for receiving screws 16 for mounting the same to the side wall 17 of the housing or casing which is preferably made in two parts as indicated at 18 and 19 which are attached together by means of screws 37. The shaft 14 is rigid with the two coils 7 and 8 so as to move therewith and is also attached fixedly to a pointer or index 20, which cooperates with a scale 21 the scale being provided with suitable graduations as shown in Figs. 1 and 2 and is mounted in fixed position on the plate 15.

An annular casting 22 is adapted to rotate within the lower portion of the housing 9 and is held in bearing relation within the housing by the projection 23 provided on the upper portion 18 of the housing. This casting 22 is provided with exterior worm teeth 24 which are engaged by a worm 25 on the end of a shaft 26 which is adapted to be manually operated by a hand knob 27 so as to permit the manual adjustment of the casting 22 to any desired position.

The casting 22 forms a mount for a permanent horseshoe magnet 28 which is firmly mounted on the casting by means of the screws 38. The two poles of the magnet straddle the galvanometer coils 7 and 8 and produce a field which is effective upon the field produced by the two galvanometer coils. It will now be understood that the permanent magnet may be manually adjusted so that its field will be in the same direction as the field produced by the galvanometer coils 7 and 8 when the coils are in their normal position as indicated in Fig. 1. An index or pointer 30 of the form shown in Fig. 3 is mounted on the magnet by a screw 29, and is adapted to cooperate with a graduated scale 31 which is calibrated in points of the compass. This scale 31 is mounted in fixed position on the front of the housing, and the scale as well as the indicating pointer 20 and scale 21 of the galvanometer are all protected by a glass cover plate 32 which is held in position on the housing by a threaded cap 33.

The operation of the device is as follows. When the craft is flying straight ahead with the apparatus as shown in Fig. 1, as long as the course is maintained, the direction of the earth's field will bear the same relation to the commutator coils and brushes as the direction of the magnetic field of the instrument bears to the two coil windings. Should, however, a deflection in the course occur, the current in one of the indicating coils will increase and in the other decrease, so as to change the direction of the field produced by the two coils, this being shown by deflection of the pointer 20 to the right or left as the case may be. The pilot will then immediately return the ship to its former position and in doing so return the pointer 20 to its zero position. Should the pilot desire to fly in a different direction, say for example approximately southwest, he would adjust the position of the permanent magnet within the housing manually until the index 30 points to the desired direction on the scale 31 as shown in Fig. 2. He would then so steer the craft that the pointer 20 would be returned and held at its zero position and when this obtains he will know that he is flying in the direction indicated on the compass scale. Should he be flying without any knowledge of the direction in which he is travelling, he would merely adjust the screw 27 to adjust the permanent magnet until the needle 20 returns to its predetermined normal position and he could then read the direction in which the longitudinal axis of the craft points by referring to the index 30 in the scale 31. The arrangement as above set forth permits the full operation of the device throughout a range of 360° and is far superior to the prior constructions which either require a plurality of instruments for simultaneous reference to obtain a true direction or which merely give the line of motion without the direction of motion along this line.

I am aware that various modifications and changes may be made within the scope of my invention and I do not desire to be limited to the exact constructions shown herein and described as an example thereof.

What I claim is:

1. In an indicator of the class described, in combination, a housing, an armature pivoted therein and consisting of a plurality of coils so angularly related that they have a common diameter coinciding with the pivot axis, the coils being adapted for connection in separate circuits, a magnet mounted in said housing to turn about an axis coincident with that of said armature and having poles which straddle the armature, means for moving said magnet about said armature, a pointer and a scale, one connected to the armature and the other to the housing, so as to register the relative pivotal movement between said parts, and a second pointer and scale correspondingly related to the magnet and housing respectively so as to be capable of registering relative movement between the latter, the graduations of the last named scale being similar to those of a compass card.

2. In an indicator of the class described, in combination, a housing, an armature pivoted therein and consisting of a plurality of coils so angularly related that they have a common diameter coinciding with the pivot axis, the coils being adapted for connection in separate circuits, a magnet mounted in said housing to turn about an axis coincident with that of said armature and having poles which straddle the armature, a soft iron core between the magnet poles within said coils and fixed to said housing, means for moving said magnet about said armature, a pointer, and a scale, one connected to the armature and the other to the housing, so as to register the relative pivotal movement between said parts, and a second pointer and scale correspondingly related to the magnet and housing respectively so as to be capable of registering relative movement between the latter, the graduations of the last named scale being similar to those of a compass card.

3. In combination with a two coil earth inductor generator, the coils whereof are angularly related and the commutator whereof is provided with two pairs of brushes, each pair having the same angular relation to the other pair as do the coils, of an indicator, comprising a housing, an armature pivoted therein and consisting of two coils having the same angular relation to one another as do the coils of the generator and each connected in circuit with its own pair of brushes of the generator, a magnet mounted in said housing to turn about an axis coinciding with that of said armature and having poles which straddle the armature, means for moving said magnet about said armature, a pointer and scale, one connected to the armature, the other to the housing so as to register the relative pivotal movement thereof and a second pointer and scale similarly related to the magnet and housing respectively so as to register relative movement between the latter, the graduations of the last named scale being similar to those of a compass card.

4. In an indicator for use in reference to the earth's magnetic field, in combination, a housing, a magnet rotatable about an axis midway between its poles on said housing, an armature comprising two coils at right angles to one another, the armature being adapted to turn about an axis coinciding with the axis of said magnet, a scale fixed in relation to said housing, an index fixed to said armature and cooperating with said scale and a direction indicator connected to the magnet, for the purpose described.

5. In an indicator for use in navigating a craft, in combination, a housing, a permanent magnet therein, means mounting said magnet to rotate thru 360° about an axis between its poles and concentric with and fixed in relation to said housing, means for manually rotating said magnet, an armature in said casing and consisting of two coils at 90° apart, said armature being pivoted to turn between the poles of said magnet about an axis coinciding with the axis of the magnet, an index needle fixed to said armature, a scale cooperating with said needle and fixed on said housing, an index on said magnet, and an annular scale fixed in said casing and calibrated in points of the compass and cooperating with said magnet index.

6. In an indicator in combination, a cylindrical housing, a permanent magnet therein, means mounting said magnet to rotate thru 360° about an axis between its poles and concentric with, and in fixed relation to said housing, means for manually rotating said magnet, an armature in said casing and comprising two coils at 90° apart and wound about a soft iron core, said armature being pivoted to turn between the poles of said magnet about an axis coinciding with the axis of said magnet, an index needle fixed to said armature, a scale cooperating with said needle and fixed on said housing, an index on said magnet, and a fixed annular scale calibrated in points of a compass and cooperating with said magnet index, said coils being adapted each to be connected to an external circuit.

In testimony whereof I affix my signature.

VICTOR E. SHOWALTER.